United States Patent
Beachley

[15] 3,678,338
[45] July 18, 1972

[54] PROTECTIVE AUTOMATICALLY DISCONNECTABLE GROUPING MEANS FOR AN UNGROUNDED A.C. ELECTRICAL DISTRIBUTION SYSTEM

[72] Inventor: Robert W. Beachley, P.O. Box 11281, Charlotte, N.C. 28209

[22] Filed: Feb. 25, 1971

[21] Appl. No.: 118,700

[52] U.S. Cl............................................317/18 R, 317/40 A
[51] Int. Cl. .......................................................H02h 3/16
[58] Field of Search.............................317/18 R, 18 D, 40 A

[56] References Cited

UNITED STATES PATENTS 2,523,778    9/1950    Randall................................317/18 R
1,731,971   10/1929    Courtin et al. ......................317/18 R Primary Examiner—James D. Trammell
Attorney—Polachek, Saulsbury & Hough

[57] ABSTRACT

An ungrounded a.c. electrical distribution system is provided with a protective grounding device in circuit with means for automatically disconnecting the grounding device in the event that a fault to ground occurs on any line of the system. The grounding device can be a transformer having a neutral grounded point. The automatic disconnection means may be circuit breakers or current limiting fuses and may further include a relay assembly having automatically opening contacts. The relay assembly can be thermally operable. The transformer can be a zig-zag transformer. External signal devices can be connected to the relay assembly.

10 Claims, 3 Drawing Figures

PATENTED JUL 18 1972 3,678,338
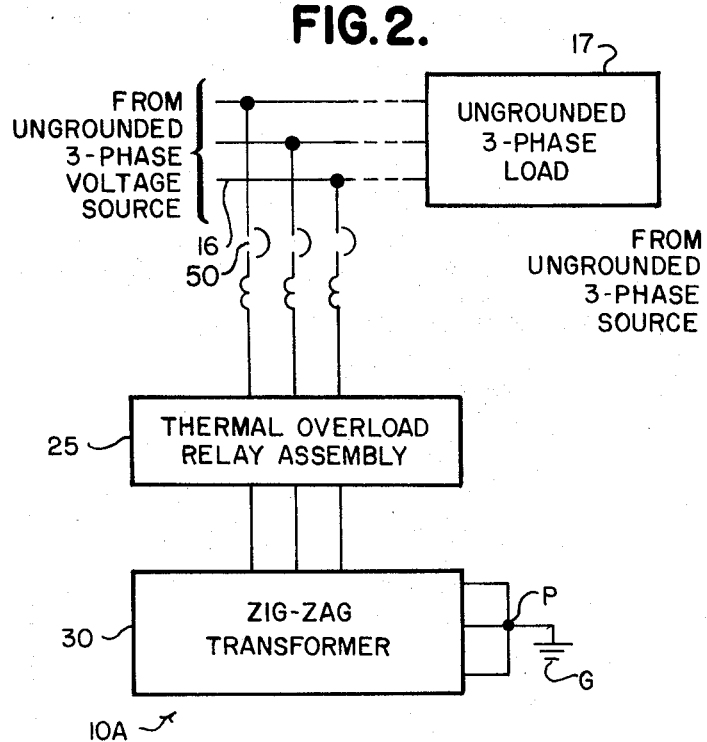
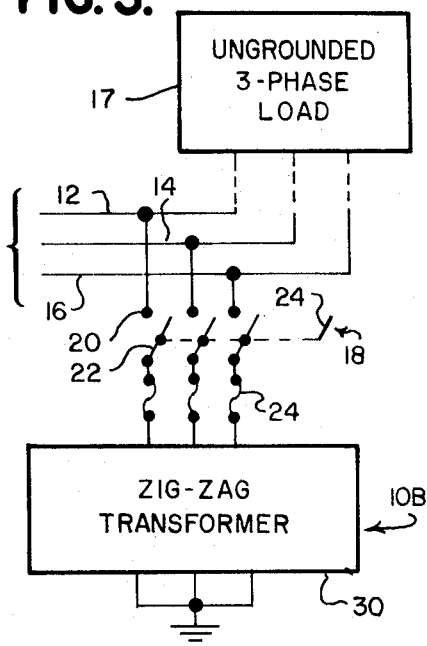
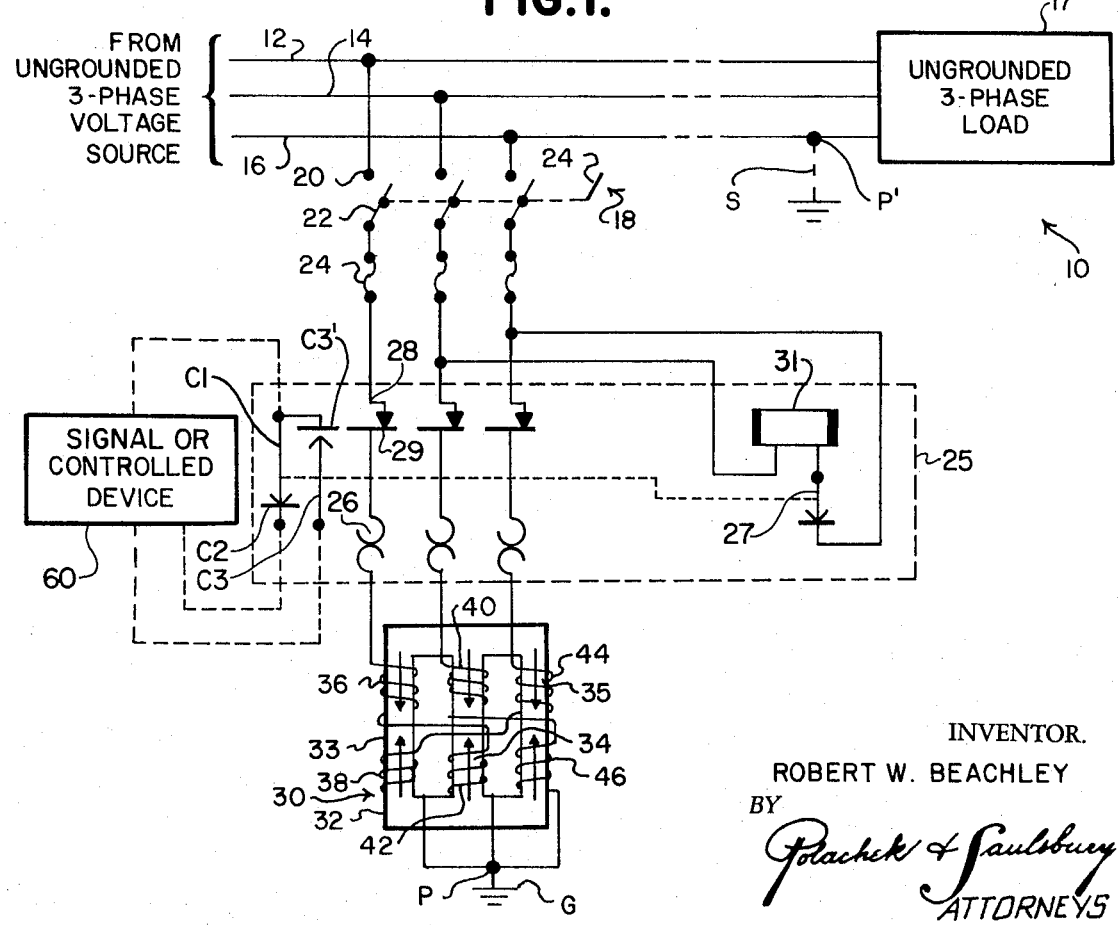
INVENTOR.
ROBERT W. BEACHLEY
BY
Polachek & Saulsbury
ATTORNEYS

PROTECTIVE AUTOMATICALLY DISCONNECTABLE GROUPING MEANS FOR AN UNGROUNDED A.C. ELECTRICAL DISTRIBUTION SYSTEM

This invention concerns means providing an ungrounded a.c. electrical distribution system with a neutral grounding device and means for automatically disconnecting the grounding device upon occurrence of ground fault of sufficient magnitude in the system.

The present invention is applicable to alternating current electrical distribution system in which all conductors are insulated from earth. The invention provides a reference ground to the system so that in normal operation with no electrical ground fault in the system, the operating characteristics of the system are the same as in a grounded system. The reference ground is connected to the system through automatically operated disconnection means which disconnect the grounding means from the system if a ground fault of sufficient magnitude occurs to operate the automatic disconnection means. By this arrangement the system will continue to deliver power even though one conductor or phase of the system is grounded by a ground fault.

Currently three-phase alternating current systems such as employed in industrial power plants, are generally electrically balanced. Each phase is electrically displaced from the other two phases by 120 electrical degrees. Such electrical systems have been operated grounded or ungrounded. The grounded system generally employs a solid direct connection between a neutral point or line of the system and earth. This may be a connection to water piping, a ground grid, or other such direct grounding means. An ungrounded system has all of its electrical conductors insulated from earth and operated at some potential from earth. The grounded system has the advantage that in the event of transient overvoltages, damages to loads on the line will be minimized. This provides greater safety to personnel and reduces operating and maintenance expense incurred by users of the system. The ungrounded system has the important advantage that it can continue to deliver power to power consuming loads and equipment in the system even though one conductor is accidentally grounded.

Frequently, during some system change, an existing ungrounded electrical distribution system is centrally grounded, changing the utility delivery voltage from the characteristics of delta ungrounded to that of wye, center grounded. This transformation may be accomplished by the connection of any type of electrical load connected in wye with the central point grounded, to the delta ungrounded service. Such a load can be resistive, reactive, capacitive or a combination of these, with the phase values balanced to properly locate the ground connection at neutral. The generally preferred method is to use inductive grounding in the form of a wye-delta bank of transformers, a T-connected transformer, or a zig-zag transformer. The use of all of these types of connection for establishing a grounded neutral on a previously ungrounded a.c. system is well known and frequently used. The installation of such grounding means, permanently converts the system from an ungrounded system to a grounded neutral system. In such conversions, the grounding equipment whether transformers or other means is permanently connected and of such size that it can safely carry any expected ground fault current. Although the grounding equipment may be connected to the system through its own disconnect means, the grounding equipment always remains connected to the system during the occurrence of all ground faults regardless of their magnitudes. As a result of grounding the system, the advantage of continued system service is lost in the event of occurrence of a ground fault.

The present invention makes it possible to obtain the benefits of both an ungrounded and a grounded system. During normal operation the system operates as a grounded neutral system. If a ground fault occurs in the system, its grounding is removed automatically and the system continues to deliver power while measures are taken to locate and clear the ground fault. The purposes of the invention are accomplished by connecting a zig-zag transformer with neutral grounded to the power distribution system. The zig-zag transformer is located as close as possible to the source of power and in advance of ground fault detection equipment. While a zig-zag transformer is preferred, other types of grounding devices can be used. The grounding device whatever its construction, is connected to the power distribution lines through means for automatically cutting out the grounding device in the event that a ground fault occurs. This automatic cutout device is preferably a relay with thermal overload contacts which open in the event a ground fault current occurs having a magnitude above the safe current carrying capacity of the grounding means. When the relay opens due to occurrence of a ground fault of sufficient magnitude, the zig-zag transformer or other grounding device is disconnected from the system, and the system characteristics revert to those of an ungrounded system with only one phase grounded by the ground fault. This permits continued operation of the power distribution system until the ground fault can be located and corrected by repairmen.

The zig-zag transformer is preferably chosen of such size and current carrying capacity, that it will stay connected through minor, nuisance ground faults and will only be cut out when a serious ground fault occurs in any phase of the system.

Two important benefits will result from using a neutral grounded zig-zag transformer in an otherwise ungrounded electrical distribution system. First, an intermittent ground, such as a conductor lightly brushing a conducting surface, for example, will exhibit arcing due to the ground path provided by the zig-zag transformer, and will thus be more easily located by visual examination of the system. Second, the entire system can continue to operate until proper measures are taken to correct a ground fault located by proper ground fault detection means.

The invention is applicable to single-phase and two-phase as well as to three-phase systems. Other and further features, objects and advantages of the invention become apparent from the following detailed description of the invention taken together with the accompanying drawings, wherein:

FIGS. 1, 2 and 3 are diagrams of three electrical power distribution systems including neutral grounding means with different arrangements of automatic cutout means for the grounding means.

Referring first to FIG. 1, there is shown schematically a three-phase electrical distribution system 10 providing a.c. electrical power in three phases on three wire conductors 12, 14 and 16. The conductors terminate at a suitable load 17 capable of utilizing three-phase electric power. A switch 18 is provided having fixed contacts 20 connected to the respective conductors 12, 14 and 16 and three ganged poles 22 actuated by control arm 24 to close with contacts 20 respectively. Connected to the respective switch poles are fuses 24. A relay assembly 25 is further provided in the system. This relay assembly has heat sensitive elements 26 respectively connected in series with the switch poles 22, fuses 24 and normally closed relay contacts 28, 29. Zig-zag transformer 30 is connected to relay assembly 25. A normally closed switch 27 is connected in series with relay coil 31. This relay coil holds contacts 28, 29 in closed position when it is energized upon closure of switch 18. Coil 31 is connected to one pair of conductors 14, 16 via switch 18. All the heat sensing elements are arranged to operate switch 27 to open it if any one heat sensitive element 26 passes too large a current. Switch 27 will deenergize holding coil 31. When holding coil 31 becomes deenergized, contacts 28 and 29 open in all three phases of the distribution system, thus completely disconnecting zig-zag transformer 30 from lines 12, 14 and 16.

Transformer 30 has a magnetic core 32 with three legs 33, 34 and 35. Coils 36, 38 are wound on leg 33 in opposite directions; coils 40, 42 are wound on leg 34 in opposite directions and coils 44, 46 are wound on leg 35 in opposite directions. Coil 36 is connected in series with coil 42. Coil 40 is connected in series with coil 46. Coil 44 is connected in series with coil 38. Coils 38, 42 and 46 are connected at point P to ground or earth G. Thermal elements 26 of relay 25 are connected respectively to coils 36, 40 and 44. By the arrangement described a neutral ground is effectively applied to the three-phase circuit 12, 14, 16, when switch 18 is closed.

The system now operates normally as one connected to a neutral ground. The advantages of such operation are well known and have been pointed out briefly above. Suppose now that a minor temporary grounding fault S to earth occurs on any line conductor, for example at point P' on line conductor 16. Before the ground fault occurred, the potential at point P was at the electrical center of the three-phase voltages and the value of this potential from any phase to ground was the phase-to-phase voltage divided by the square root of three. Now, when a ground fault occurs at point P', current will flow into the ground, into the steel of a building housing the equipment, or any convenient path back to point P, through the zig-zag transformer to the other two phases 12 and 14. A current flowing from point P' to ground and attempting to reach phase 12 must pass through coil 36, but to get to coil 36 it must pass from point P through coil 42. All six coils of the zig-zag transformer have the same number of turns. Therefore, a current in coil 36 will induce (by transformer action) a current of like magnitude in coil 38, and a current in coil 42 will induce a like current in coil 40, and so on, with the result that the ground fault current at P' is divided into three equal parts, each part flowing back to one of the phases. The result is that the zig-zag transformer will attempt to keep the potential of all three phases the same to ground. The amount of current that will flow to ground from point P' will be determined by the circuit characteristics and the "solidness" of the ground at point P'. If the zig-zag transformer is left connected to the circuit, the amount of current flowing to ground at point P' may become enough to interrupt the flow of power to the load by blowing circuit fuses or tripping a circuit breaker; or by heating at point P', a fire may start before the circuit is interrupted. However, if the zig-zag transformer can be automatically disconnected from the circuit when a preset value of ground fault current is reached, the ground fault return path will be broken and power flow to the load need not be interrupted by operation of normal circuit protective devices.

Relay assembly 25 and transformer 30 are protected by fuses 24. The accidental grounding of point P' may be so severe and sudden that the thermal response of relay assembly 25 is not quick enough to prevent damage to the relay assembly and or the transformer. For this reason, fuses 24 are in the circuit and will blow before damage can result. Further, because of the fuse protection, the transformer and the relay assembly need not be of size sufficient to safely experience ground faults of any magnitude, but need be only of such size as to continue operation through small nuisance ground faults that neet not cut off the zig-zag transformer. If the surge in current is very large and rapid and occurs before relay 25 can respond, any one or all of fuses 24 will open. In this way the grounding will be limited to the ground fault condition at point P' and remedial measures can be instituted according to some prearranged plan and schedule to locate and correct the ground fault. Since the system conductors 12, 14 and 16 are now ungrounded, except for the ground fault at point P', power will continue to flow to the load 17. Thus the power supply to the load remains uninterrupted whether the fault to ground at point P' is small or large. In addition, the transformer 30 is prevented from burnout since the fuses 24 will blow before any damage occurs to any of the transformer windings.

System 10A shown schematically in FIG. 2 is similar to system 10 of FIG. 1 and corresponding parts are identically numbered. Here circuit breakers 50 replace the switch 18 and fuses 24 of system 10. The thermal overload relay assembly 25 and zig-zag transformer 30 operate in the same way as explained above in connection with system 10. All of the circuit breakers 50 will open in order to protect the windings of the zig-zag transformer from burnout if a prolonged fault to ground occurs at any one line 12, 14 and 16.

System 10B shown schematically in FIG. 3 dispenses with the thermal overload relay assembly 25 of systems 10 and 10A but continues use of switch 18 and fuses 24. The fuses will blow to protect the windings of the transformer 30 and to disconnect the lines 12, 14 and 16 from ground via the transformer if a fault to ground occurs as explained above. System 10B will be useful on high voltage systems where the initial cost of relay assembly 25 can be avoided. Fuses 24 will blow for larger ground fault currents and will disconnect the grounding means from the system as in system 10.

In systems 10, 10A and 10B, the disconnecting of the grounding means is automatic, but its reconnection is part of the work of repairmen, after they seek and eliminate the ground fault. The relay assembly could be of an automatic reclosing type which would restore the grounding means to the circuit should it happen that the ground fault cleared itself. However, it is considered safer and better practice that the grounding means remain disconnected until, by human intervention, the ground fault is noted, the reason for the fault is found and corrected.

Relay assembly 25 is provided with further contacts C1, C2 and C3, C3', arranged to be operated by the heat sensing elements 26 when contacts 28 and 29 open. Contacts C1, C2 open and contacts C3, C3' close when contacts 28, 29 open. These contacts can be connected to an external signal or control device 60 for signaling that the grounding means has become disconnected, requiring the attention of repair or service personnel. The signal device can be a horn, light or control device of any desired type.

By the system arrangement described, the electrical distribution system is enabled to take advantage of the best characteristics of both a grounded system and an ungrounded system.

Although a limited number of embodiments of the invention have been described and specifically illustrated this has been by way of example only. Many changes and modifications are possible. For example, a wye — delta transformer can be substituted for a zig-zag transformer. The grounding means and automatic cut-out for the grounding means can be applied to a single-phase or a two-phase power distribution system. Other types of automatically opening relay assemblies can be used than the specific thermal overload relay assembly illustrated. Still other modifications and variations are possible without departing from the spirit and scope of the invention as defined in the appended claims.

What is claimed is:

1. Protective means for a normally ungrounded electrical distribution system having a plurality of ungrounded conductors connected to a load, comprising automatically openable current conducting means responsive to any current above a predetermined magnitude connected to said conductors respectively and arranged to open when current in any one of said current conductive means rises above said magnitude; and a grounding device connectable and when in use connected between said conductive means and ground to provide a neutral ground for the ungrounded conductors, whereby said grounding device is automatically cut off from said conductors when a fault to ground of sufficient magnitude and duration occurs between any one of said conductors and ground, said automatically opening current conductive means comprising for each of said ungrounded conductors switch means and fuse in series circuits with said grounding device and in parallel with said load to said conductors, when said conductors are connected, and the automatically opening current conductive means comprising a relay assembly including automatically opening current overload switch contacts in series with said grounding device and in parallel with said load to said conductors, when said conductors are connected.

2. Protective means as defined in claim 1, including said ungrounded conductors in an operatively connected state.

3. Protective means as defined in claim 1, wherein the automatically opening current conductive means further comprises current limiting fuses connected in said series circuits with said switch contacts and said ground.

4. Protective means as defined in claim 1, wherein said relay assembly has thermally responsive elements arranged to open said contacts in response to excessive current passing therethrough, wherein the automatically opening current conductive means further comprises current limiting fuses connected in series circuits with said switch contacts and said ground, and wherein said grounding device is a transformer having a neutral grounding point.

5. Protective means as defined in claim 4, wherein said relay assembly further includes means for connecting an external signal device thereto for indicating when said fault to ground occurs, and wherein said transformer is a zigzag transformer.

6. Protective means as defined in claim 1, wherein said relay assembly has thermally responsive elements arranged to open said contacts in response to excessive current passing therethrough.

7. Protective means as defined in claim 1, wherein said grounding device is a transformer having a neutral grounding point.

8. Protective means as defined in claim 7, wherein said transformer is a zig-zag transformer.

9. Protective means as defined in claim 1, wherein said relay assembly further includes means for connecting an external signal device thereto for indicating when said fault to ground occurs.

10. Protective means as defined in claim 9, wherein said grounding device is a transformer having a neutral grounding point.

* * * * *